Oct. 29, 1963  W. R. STALLWORTH  3,108,287
BALL VALVE ASSEMBLY
Filed April 3, 1962
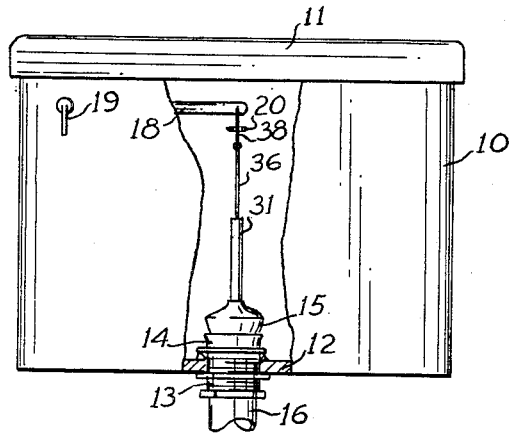
Fig. 1
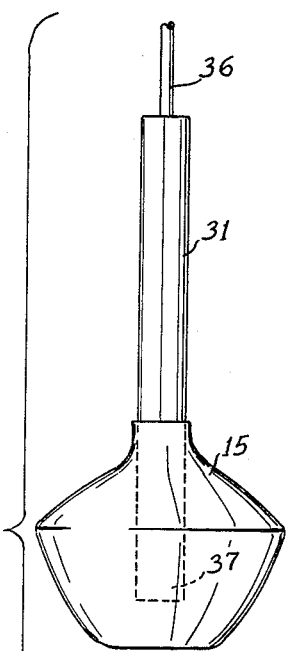
Fig. 4
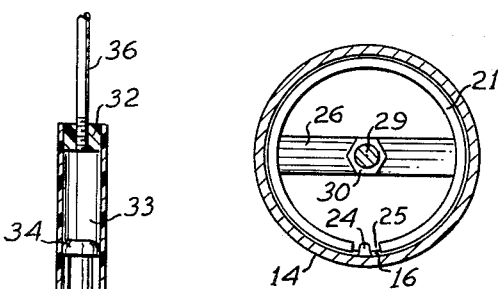
Fig. 3
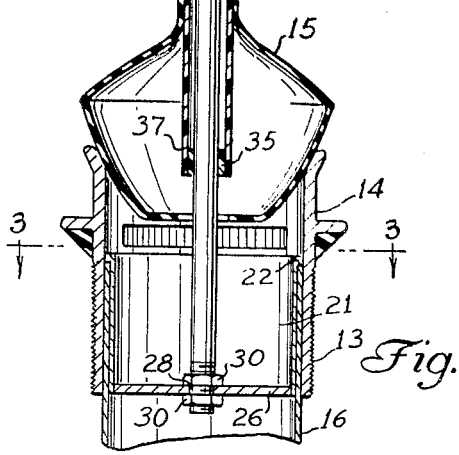
Fig. 2
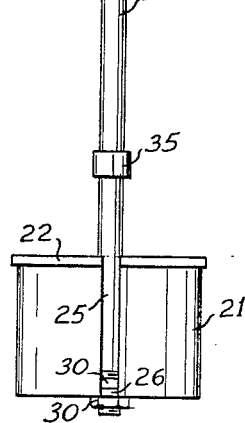
INVENTOR.
William R. Stallworth 3,108,287
BALL VALVE ASSEMBLY
William R. Stallworth, Box 116, Porterdale, Ga.
Filed Apr. 3, 1962, Ser. No. 184,887
2 Claims. (Cl. 4—56)

This invention relates to a ball valve assembly, and is more particularly concerned with a ball valve including means for guiding the ball toward the valve seat.

Ball valves are in very common use, and find particularly extensive use in the water supply tanks of toilets. The conventional ball valves are quite troublesome in that they will leak, causing both a nuisance and an excessive water bill. In the past, many attempts have been made to correct the leaking, which most commonly occurs due to faulty seating of the ball on the valve seat. The prior art devices have included such things as propellers or shafts on the bottom of the ball to seat the ball by the rush of water through the outlet pipe. Other attempts have comprised a cage surrounding the ball to weight the ball sufficiently to cause proper seating. None of the prior art devices has proved entirely satisfactory.

The present invention overcomes the abovestated objections by providing means for positively guiding the ball toward the valve seat. The ball is so held as to be capable of movement in only one direction; i.e., vertically. Means are also provided to align the guide means with the valve seat so that improper seating is virtually impossible.

In general terms, the device of the present invention comprises a cylindrical base adapted to fit within the outlet pipe. From the cylindrical base, a guide rod extends upwardly, axially of the base, hence axially of the valve seat. The ball is provided with a hollow, tubular stem aligned with the guide rod and closed at its upper end, so as to receive, slidably, the guide rod. The usual activating rod is affixed to the top of the stem. Thus, the ball may move vertically with the tubular stem riding over the guide rod; but, the ball is held from movement in any other direction.

It is therefore an object of the present invention to provide a ball valve which will always seat properly.

It is another object of the present invention to provide a ball valve in which the ball is positively guided toward the valve seat.

Another object of the present invention is to provide a ball valve assembly which is easy to install in existing equipment.

A further object of the present invention is to provide an improved ball valve assembly which is durable in structure, very efficient in operation, and well designed to meet the demands of economic manufacture.

Other and further objects, features and advantages of the present invention will become apparent from consideration of the following specification taken in conjunction with the accompanying drawings in which:

FIG. 1 is a front elevational view of a toilet tank, partially broken away, and having the ball valve assembly of the present invention installed therein.

FIG. 2 is a diametric cross sectional view of the ball valve assembly shown in FIG. 1, the valve being in closed position.

FIG. 3 is a cross-sectional view taken substantially along the line 3—3 in FIG. 2.

FIG. 4 is an exploded view of the ball valve assembly shown in FIGS. 1–3.

Referring now more particularly to the drawings and to that embodiment of the invention here chosen by way of illustration, FIG. 1 shows a toilet tank 10 having the usual open top closed by cover 11. Projecting through the bottom 12 of the tank 10 is the lower threaded portion 13 of the valve seat, generally designated at 14, which receives the outlet pipe 16. The ball 15 rests on the valve seat 14 and may be lifted by the arm 18 operated by the handle 19. The tank 10 is of a recent design having the overflow pipe molded into the tank wall, as shown at 20. It will be understood by those skilled in the art that the usual float valve arrangement is installed in the tank to keep the tank full of water; and, a water supply tube (not shown) communicates with the overflow pipe 20 to maintain the required level of water in the toilet bowl.

The ball valve assembly includes a cylindrical base member 21 having a rim 22 around the entire upper periphery of the base 21. The diameter of the base 21 is such as to be received by the outlet pipe 16 with a very tight fit, while the rim 22 is too large to go into the pipe 16. The conventional valve seat is formed with a small projection 24 extending from the inside wall to act as a stop for the outlet pipe. In order for the base 21 to go past the projection 24, a slit 25 is provided in the side wall. The slit 25 also provides a biasing means whereby the base 21 may be adjusted to fit more tightly within the outlet pipe 16.

Diametrically across the bottom of the base 21 is a strap 26, rigidly attached, as by welding, to the lower edge of the base 21. Centrally of strap 26 is an opening 28 which is axially aligned with the cylindrical base 21. The opening 28 receives a guide rod 29 which is held in place by a pair of nuts 30 threadedly engaging the lower end of the guide rod 29. It will thus be seen that the outlet pipe 16 is axially aligned with the valve seat 14; the base 21 is axially aligned with the outlet pipe 16; and, the guide rod 29 is axially aligned with the base 21.

The ball 15 must, of course, be aligned with the valve seat 14, and must reciprocate vertically. The present arrangement includes a substantially conventional ball 15 provided with a hollow, tubular, axial stem 31 closed at its upper end by a plug 32. The stem 31 receives the guide rod 29 in the central bore 33. The uppermost end of the guide rod 29 has formed integrally thereon a head 34 which is of only slightly less diameter than the inside bore 33 of the stem 31, giving a slidable fit, but not appreciable lateral movement. The lowermost end 37 of the stem 31 has therein a sleeve 35, the outside of which is a tight fit in the stem; and, the inside of which allows a slidable fit with the guide rod 29. Thus, the sleeve 35 and the head 34 provide two areas of contact between the bore 33 of stem 31 and the guide rod 29 so that no appreciable lateral movement of the stem with respect to the rod is possible; yet, the stem 31 may reciprocate vertically over the guide rod 29. The head 34 will not pass through the sleeve 35, thus providing an upper limit to the movement of the stem 31.

The plug 32 in the upper end of the stem 31 is affixed by gluing or the like, and is provided with an internally threaded hole to receive the actuating rod 36 by which the stem 31 and ball 15 are lifted. The actuating rod 36 is connected by link 38 to the arm 18, as is conventional.

From the foregoing discription, the operation of the device should be obvious. The cylindrical base 21 is inserted through the valve seat 14 into the outlet pipe 16, and urged downwardly until the rim 22 engages the upper edge of the outlet pipe. The guide rod 29, stem 31 and ball 15 are all concentric, or axially aligned; therefore, with the base 21 fitted into the outlet pipe 16, the entire valve assembly is concentric with the valve seat 14. The stem 31 and the ball 15 are held from lateral, or radial, movement while being free to move vertically; hence, the ball 15 may be pulled upwardly to allow water to pass; and, when the water level is sufficiently low to allow the ball 15 to fall toward the valve seat 14, the ball is guided all the way to the seat, insuring perfect seating.

The particular structure of the device here presented is well suited to simple manufacturing methods in that most of the parts are readily obtainable. The stem 31 may be a standard tube of a plastic, a light-weight metal or the like. The ball 15 is readily available, and the actuating rod 36 is of quite conventional design. The guide rod 29 may be a standard bolt; and, the cylinder 21 requires no complex machining operations. The assembly of the device requires only the simplest of operations.

To market the ball valve assembly the device may be assembled only as far as is shown in FIG. 4, having the guide rod 29 attached to the base 21, with the sleeve 35 surrounding the rod 29. The purchaser can easily assemble the device by putting a small amount of glue on the sleeve 35 and inserting the sleeve into the lower end 37 of the stem 31.

Also, the device is quite easy to install. Though a modern toilet tank is here shown, the device will work equally well in the older tanks having an overflow pipe formed integrally with the valve seat. In either case, one need but to remove the old ball, insert the cylindrical base member 21 through the valve seat until the rim 22 contacts the top of the outlet pipe 16. The link 33 is attached to the arm 18, and the device is ready for operation.

The device here presented is by way of illustration only, and is meant to be in no way restrictive; therefore, numerous changes and modifications may be made, and the full use of equivalents resorted to without departing from the spirit or scope of the invention as outlined in the appended claims.

I claim:

1. In a water tank having a substantially cylindrical valve seat, said valve seat receiving in the lower end thereof an outlet pipe, a ball adapted to be moved into and out of engagement with said valve seat, and an arm connected to said ball to effect said movement, a cylindrical base received by said outlet pipe, an external rim on the upper periphery of said cylindrical base to limit the entrance of said base into said outlet pipe, a strap affixed diametrically across said cylindrical base, said strap carrying a guide rod axially of said cylindrical base, said guide rod having a head on the uppermost end thereof, a hollow stem received on said guide rod, said hollow stem being of such size as to slide easily axially of said head but not to move appreciably radially of said head, a sleeve fixed in the lowermost end of said hollow stem, said sleeve surrounding said guide rod, said sleeve being of such size as to slide easily axially of said guide rod but not to move appreciably radially of said guide rod, said ball being mounted on said stem concentric therewith, a plug in the uppermost end of said stem, said plug receiving an actuating rod, said actuating rod being operably connected to said arm to be movable thereby.

2. In a water tank having a valve seat in the bottom thereof, said valve seat receiving an outlet pipe, and a ball adapted to be moved into and out of engagement with said valve seat, the combination therewith of stabilizing means within said valve seat, said stabilizing means also acting to align said ball with said valve seat, said stabilizing means including a substantially cylindrical base received within said outlet pipe and having a slit extending the full length of said base, said slit acting as a parting-line to allow said base to be biased outwardly for firm frictional engagement with said outlet pipe, a strap attached to said base and extending inwardly thereof, said strap carrying a guide rod axially of said valve seat, said guide rod having an enlarged head on the upper end thereof, a hollow stem received on said guide rod, a sleeve fixed in said hollow stem, said sleeve being arranged to cooperate with said head to act as a stop to limit upward movement of said hollow stem, said ball being secured to said hollow stem.

References Cited in the file of this patent
UNITED STATES PATENTS

| | | |
|---|---|---|
| 1,889,626 | Bell | Nov. 29, 1932 |
| 2,011,782 | Teahen | Aug. 20, 1935 |
| 2,613,367 | Denham | Oct. 14, 1952 |
| 2,736,903 | Woff et al. | Mar. 6, 1956 |
| 2,795,237 | Corbin | June 11, 1957 |
| 2,894,264 | Walter | July 14, 1959 |